(12) United States Patent
Dong et al.

(10) Patent No.: US 12,413,579 B2
(45) Date of Patent: Sep. 9, 2025

(54) SECURING CONNECTIONS BETWEEN A NETWORKING AND SECURITY CONTROLLER AND DISTRIBUTED AGENTS IN A CONTAINER-BASED CLUSTER

(71) Applicant: VMware, Inc., Palo Alto, CA (US)

(72) Inventors: Wenying Dong, Beijing (CN); Jianjun Shen, Redwood City, CA (US); Rahul Jain, Jaipur (IN); Quan Tian, Beijing (CN); Mengdie Song, Beijing (CN); Xu Liu, Beijing (CN)

(73) Assignee: VMware LLC, Palo Alto, CA (US)

( * ) Notice: Subject to any disclaimer, the term of this patent is extended or adjusted under 35 U.S.C. 154(b) by 159 days.

(21) Appl. No.: 18/481,557

(22) Filed: Oct. 5, 2023

(65) Prior Publication Data
US 2025/0119422 A1   Apr. 10, 2025

(51) Int. Cl.
G06F 9/54   (2006.01)
H04L 9/40   (2022.01)
H04L 41/046  (2022.01)

(52) U.S. Cl.
CPC ............ *H04L 63/083* (2013.01); *G06F 9/547* (2013.01); *H04L 41/046* (2013.01); *H04L 63/105* (2013.01)

(58) Field of Classification Search
CPC ... H04L 63/083; H04L 41/046; H04L 63/105; G06F 9/547
See application file for complete search history.

(56) References Cited

U.S. PATENT DOCUMENTS

| | | | |
|---|---|---|---|
| 11,399,039 B2 * | 7/2022 | Rubin | G06F 21/554 |
| 2021/0051029 A1 * | 2/2021 | Pham | G06F 21/33 |
| 2021/0288981 A1 * | 9/2021 | Numainville | H04L 63/1416 |
| 2024/0129310 A1 * | 4/2024 | Andrews | H04L 63/029 |
| 2025/0023918 A1 * | 1/2025 | Sethi | H04L 63/20 |

* cited by examiner

*Primary Examiner* — Minh Chau Nguyen
(74) *Attorney, Agent, or Firm* — King Intellectual Asset Management

(57) ABSTRACT

The disclosure provides a method for authenticating a network agent deployed in a networking environment. The method generally includes receiving, by a network controller in the networking environment, a name of an external node where the network agent is running and a token associated with the external node; in response to receiving the name of the external node, obtaining, by the network controller, a secret associated with the token; parsing, by the network controller, the secret to determine an expected external node name corresponding to the token; comparing the expected external node name with the received external node name; and trusting the network agent when the expected external node name and the received external node name match.

20 Claims, 9 Drawing Sheets

```
> echo -n 'vm2' | base64  ⟵ 406
dm0y

> cat secret2.yaml
apiVersion: v1
kind: Secret  ⟵ 402
metadata:
  name: vm2-id  ⟵ 404
  namespace: vmn1
type: Opaque
data:
  name: dm0y
```

FIG. 4

```
> POST /api/v1/namespaces/
vmn1/serviceaccounts/vm-agent/
token
{
  "kind": "TokenRequest",        ◀─── 502
  "apiVersion": "authentication.
k8s.io/v1",
  "spec": {
    "audience": [
    ],
    "boundObjectRef": {
      "kind": "Secret",          ◀─── 504
      "apiVersion": "v1",
      "name": "vm2-id",          ◀─── 506
      "uid": "4adee2c1-a2a7-4c78-
bcef-fa4f142806c5"
    }
  }
}
```

```
{
  "kind": "TokenRequest",
  "apiVersion": "authentication.k8s.io/v1",
  "metadata": {
    "creationTimestamp": null,
  },
  "spec": {
    "audiences": [
      "https://kubernetes.default.svc.cluster.local"
    ],
    "expirationSeconds": 3600,
    "boundObjectRef": {
      "kind": "Secret",
      "apiVersion": "v1",
      "name": "vm2-id",
      "uid": "4adee2c1-a2a7-4c78-bcef-fa4f142806c5"
    }
  },
  "status": {            ◀─── 508
    "token": "eyJhbGciOiJSUzI1NiIsImtpZCI6IndrY1FRSWZpTFhJMzdjVnp4Sml
yLTRBU19PeG9SRnpUUVzcXNnaVNqM0UifQ.eyJhdWQiOlsiaHR0cHM6Ly9rdWJlcm51
dGVzLmRlZmF1bHQuc3ZjLmNsdXN0ZXIubG9jYWwiXSwiZXhwIjoxNjUyNzg5Mjg2LCJp
YXQiOjE2NTI3ODU2ODYsImlzcyI6Imh0dHBzOi8va3ViZXJuZXRlcy5kZWZhdWx0LnN2
Yy5jbHVzdGVyLmxvY2FsIiwia3ViZXJuZXRlcy5pby9zZXJ2aWNlYWNjb3VudCI6eyJ4x
liwic2VjcmV0Ijp7Im5hbWUiOiJ2bTItaWQiLCJ1aWQiOiI0YWRlZTJjMS1hMmE3LTRj
NzgtYmNlZi1mYTRmMTQyODA2YzUiFSwic2VydmljZWFjY291bnQiOnsibmFtZSI6InZt
LWFnZW50Iiwidwlkijoi2TU3MWRmNjUtY2JmMS00NmVlLWE5TAtNjFkMmExMzlkMTE5
In19LCJuYmYi0jE2NTI3ODU2ODYsInN1YiI6InN5c3RlbTpzZXJ2aWNlYWNjb3VudDp2
bW4xOnZtLWFnZW50In0.Cmu4bfepWrtN_q_5wVTYy5dTTzcJAJQcoAk6ICR-
rMKJHAKCtMcVYL9RwRaxBEFeK9xFV70h4rZMSvDre7CJHchK8d1_bWeIbQeljLQL7wVG
0PUSmuSp4BxX6E6L8RDtSjemtXliiiQitJNLDHpcmcxFFzAofrLcVz4TPrbKBouKpFShR
BDsblVEfPwsVRvI3fImBs8W7YNnPbj83gP98Hsnqj1hyB-
iQP0ps81SFb4ZfIFq_xMOIwKE3HlUjyfKOxZDpBEiilqsThw0fgZbyCmiFu2E3V6fGln
PsLKi-Ll3XKKWknfr9Qit3gEga28W-5531-F07xg46U4Swkd1CCuQ",
    "expirationTimestamp": "2022-05-17T12:08:06Z"
  }
}
```

FIG. 5

```
{
    "aud": [
        "https://kubernetes.default.svc.cluster.local"
    ],
    "exp": 1652789286,
    "iat": 1652785686,
    "iss": "https://kubernetes.default.svc.cluster.local",
    "kubernetes.io": {
        "namespace": "vmn1",
        "secret": {
            "name": "vm2-id",
            "uid": "4adee2c1-a2a7-4c78-bcef-fa4f142806c5"
        },
        "serviceaccount": {
            "name": "vm-agent",
            "uid": "e571cf65-cbf1-46ee-a1e0-61d2a139d119"
        }
    },
    "nbf": 1652785686,
    "sub": "system:serviceaccount:vmn1:vm-agent"
}
```

FIG. 6

SECURING CONNECTIONS BETWEEN A NETWORKING AND SECURITY CONTROLLER AND DISTRIBUTED AGENTS IN A CONTAINER-BASED CLUSTER

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that might have pooled resources allocated in a cloud-like manner. Hybrid cloud refers specifically to a combination of public cloud and private clouds. Thus, an application deployed across a hybrid cloud environment consumes both cloud services executing in a public cloud and local services executing in a private data center (e.g., a private cloud). Within the public cloud or private data center, modern applications can be deployed onto one or more virtual machines (VMs), containers, and/or the like.

A container is a package that relies on virtual isolation to deploy and run applications that depend on a shared operating system (OS) kernel. Containerized applications, also referred to as containerized workloads, can include a collection of one or more related applications packaged into one or more containers. In some orchestration platforms, a set of one or more related containers sharing storage and network resources, referred to as a pod, may be deployed as a unit of computing software. Container orchestration platforms automate the lifecycle of containers, including such operations as provisioning, deployment, monitoring, scaling (up and down), networking, and load balancing.

Kubernetes® (K8S®) software is an example open-source container orchestration platform that automates the deployment and operation of such containerized workloads. In particular, Kubernetes may be used to create a cluster of interconnected nodes, including (1) one or more worker nodes that run the containerized workloads (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when a workload deployment's intended replication is unsatisfied). In some cases, a node, used to run containerized workloads or control plane components in a Kubernetes cluster, is a physical machine. In some cases, a node used to run containerized workloads or control plane components in a Kubernetes cluster is a VM configured to run on a physical machine running a hypervisor.

A Kubernetes platform is made up of a central database containing Kubernetes objects, or persistent entities, that are managed in the platform. Kubernetes objects are represented in configuration files, such as JavaScript Object Notation (JSON) or YAML files, and describe the intended state of a Kubernetes cluster of interconnected nodes used to run containerized workloads. There are two categories of objects in Kubernetes that are used to define the state of the cluster: native Kubernetes objects and custom resource (CR) objects, also referred to herein as "custom resources." Native Kubernetes objects may define configurations for pods, services, volumes, namespaces, deployments, replication controllers, and/or the like. These object types are supported and can be created/manipulated by a Kubernetes application programming interface (API). A custom resource, on the other hand, is an object that extends the Kubernetes API or allows a user to introduce their own API into a Kubernetes cluster. In particular, Kubernetes provides a standard extension mechanism, referred to as custom resource definitions (CRDs), such as in a YAML file, the CRD defining the building blocks (e.g., structure) of the custom resource. Instances of the custom resource as defined in the CRD can then be deployed in the cluster, such as by using a custom resource specification (e.g., another YAML file) that describes an intended state of the custom resource. As such, the CRD and custom resource specification enable the extension of the set of resources and objects that can be managed in a Kubernetes cluster.

Container-based environments, like Kubernetes, are designed to run distributed systems over a cluster of machines. The nature of such distributed systems makes cluster networking a central and necessary component, where cluster networking refers to the network infrastructure used to connect and communicate between the different components in the cluster, such as nodes, pods, containers, and workloads. To manage cluster networking, container-based environments may support a variety of networking plugins and solutions, such as, for example, Antrea™ (also referred to as "Project Antrea") made commercially available by VMware, Inc. of Palo Alto, California.

A networking and security solution for container-based clusters may include use of a container network interface (CNI) to provide network connectivity for pod workloads. A CNI is a framework for dynamically configuring a network, provisioning internet protocol (IP) addresses, and maintaining connectivity between multiple cluster components. A networking and security solution for container-based clusters may support multiple networking modes, including, for example, overlay networking (e.g., creating a virtual or logical network on top of an existing physical network) and direct routing. Further, a networking and security solution for container-based clusters may support and implement network policies (e.g., such as Kubernetes NetworkPolicies) to secure ingress/egress traffic for pods. By default, all pods, when created, are able communicate with each other. Applying a network policy to a given pod isolates it, meaning the pod can only send traffic to, or receive traffic from, a pod that has been explicitly selected.

A networking and security solution for container-based clusters may leverage software based switches (also referred to as virtual switches), such as Open vSwitch, as the networking data plane. Open vSwitch is a high-performance programmable virtual switch that supports both Linux and Windows. A virtual switch enables a networking and security solution for container-based clusters to implement Kubernetes Network Policies in a high-performance and efficient manner. Due the programmable nature of some virtual switches, a networking and security solution for container-based clusters is able to implement a set of networking and security features and services on top of the virtual switch.

The implementation of a networking and security solution for container-based clusters creates a deployment that runs a network controller (e.g., an Antrea controller) (referred to herein as the "network controller") and one or more network agents (e.g., Antrea agents). The network controller runs as a centralized controller on the control plane of a container-based cluster. The network controller is configured to (1) watch for changes to network policy, pod, and namespace resources of the cluster, (2) compute network policies based on detected change(s), and (3) distribute the computed policies to one or more network agents. The network controller leverages an API server of the cluster's control plane to implement a communication channel to each of the one or more network agents. The network agent(s) may be deployed in one or more pods on one or more worker nodes in the cluster. Further, each network agent running in each pod may create the corresponding pod's network interface, allocate an IP address, and connect the interface to the virtual switch on the networking and security solution for container-based clusters. As such, each network agent is responsible for implementing pod networking with a virtual switch on a node of the container-based cluster.

In certain embodiments, one or more network agents are also running on one or more non-cluster (e.g., non-Kubernetes) nodes (referred to herein as "external nodes"), such as a VM and/or a bare-metal server having applications running thereon. In particular, a custom resource may be created (e.g., via a CRD and a custom resource specification) to enable the network controller to manage the network connectivity and security on an external node. The custom resource may specify which network interface(s) on the external node are expected to be protected with network policy rule(s), and the network controller may create an "external entity resource" for each network interface specified. The network policy(ies) may be applied to an external node by leveraging the external entity resource(s). A network agent running on each external node may control the network connectivity and security of the external node by attaching the network interface(s) to the virtual switch.

Multiple tenants (e.g., users or customers) may run their containerized workloads on worker nodes and/or their applications on external nodes in the same networking environment, such as in a public cloud. For security purposes, the containerized workloads and/or applications of different tenants may need to be network isolated from one another within the networking environment. Further, a tenant may be divided into a number of sub-tenants, such that certain containerized workloads and/or application of different sub-tenants of a given tenant may also need to be network isolated from one another within the networking environment. As such, hierarchical isolation constructs may be implemented to network isolate worker nodes running one or more containerized workloads and/or external nodes running one or more application. In certain embodiments, the isolation constructs include organizations (orgs), projects, and virtual private clouds (VPCs). An org includes one or more projects, and a project includes one or more VPCs. An org may be associated with a particular tenant, such that different tenants are associated with different orgs. Further, a project may be associated with a sub-tenant of the tenant associated with the org that includes the project, such that different sub-tenants are associated with different projects. A VPC is a logically isolated section of the multi-tenant networking environment. The isolation may be in the form of policies such as network policies and permissions applied to worker nodes (and/or more granularly pods and/or containers) and/or external nodes running within the VPC. Since the VPC is a logical construct, "running within" may mean that the worker node and/or external node is assigned to, tagged with, or otherwise associated with the VPC.

In certain embodiments, each VPC is assigned a service account. A service account is a type of non-user account (e.g., different from user accounts, which are authenticated users in a container-based cluster) that provides a distinct identity in a container-based cluster. Each service account may have a token associated with it for authorization. Cluster components, such as worker nodes running containerized workloads, as well as other entities outside the cluster, running within a VPC, may use credentials of a particular service account assigned to the VPC (e.g., where these cluster components and/or outside entities are running) to identify as that service account. This identity may be useful in various situations, including authenticating to the API server and/or a network controller of the cluster's control plane.

For example, a worker node and an external node may be running within a same VPC. A network agent may be deployed on each node to implement networking for their respective node and thus, enable each node to communicate with a network controller (e.g., for network configuration). The network agent running on the worker node and the network agent running on the external node may use a same service account assigned to the VPC, and the corresponding authentication token, to communicate with the network controller (or an API server of the cluster). The network controller may trust the connection from each network agent based on the use of the service account and the corresponding authentication token for such communication. In other words, the network controller may trust any component that connects to the network controller using a valid service account and token.

While this level of trust may be sufficient for protecting the overall integrity and security of the system when a network agent of a worker node in the cluster attempts to connect to the network controller, the same may not be true for a network agent of an external node. In particular, a network agent of a worker node is deployed within a pod, which is generally considered to be a trusted entity. Thus, trusting communication from this network agent when using a VPC-allocated service account and token, without performing any additional validation, may be sufficient to maintain security of the system. An external node (e.g., a VM), running a network agent, however, may be more susceptible to attack, especially when deployed in the public cloud. For example, in Kubernetes, a threat actor may obtain read privileges to a kubeconfig file (e.g., YAML file used to store authentication information) of a network agent (e.g., antrea-agent.kubeconfig file) running on a VM, and use the authentication information in the file to "act" as a network agent and read/write resources in a VPC where the compromised VM was running. Further, in some cases, the threat actor may (1) obtain resources in a different VPC, (2) report fake statistics about a network agent to the network controller (e.g., generate fake NodeSummaryStats objects) by impersonating the network agent, and/or (3) create fake network policy(ies) (e.g., generate fake NetworkPolicyStatus objects) by impersonating the network agent, to name a few.

One solution to this technical problem involves assigning a unique service account to each network agent running on an external node and connecting to the network controller (e.g., as opposed to a single service account per VPC). In this way, an administrator may limit the resources given to each of these uniquely assigned service accounts to reduce security risks associated with the use of these service accounts by network agents running on external nodes. However, this solution may not be scalable, especially in cases where multiple network agents are deployed to run on multiple external nodes deployed in the public cloud. Further, management of a large number of service accounts may be difficult.

SUMMARY

One or more embodiments provide a method for authenticating a network agent deployed in a networking environment. The method generally includes receiving, by a network controller in the networking environment, a name of an external node where the network agent is running and a token associated with the external node. In response to receiving the name of the external node, the method generally includes obtaining, by the network controller, a secret associated with the token. The method generally includes parsing, by the network controller, the secret to determine an expected external node name corresponding to the token. Further, the method generally includes comparing the expected external node name with the received external node name. The method generally includes trusting the network agent when the expected external node name and the received external node name match.

Further embodiments include one or more non-transitory computer-readable storage media comprising instructions that, when executed by one or more processors of a computing system, cause the computer system to carry out the above methods, as well as a computer system comprising one or more memories and one or more processors configured to carry out the above methods.

BRIEF DESCRIPTION OF THE DRAWINGS

FIG. 4 illustrates an example secret generated by a virtual private cloud (VPC) administrator, according to an example embodiment of the present disclosure.

FIG. 5 illustrates an example token generated in response to a token request, according to an example embodiment of the present disclosure.

FIG. 6 illustrates an example payload for a generated token, according to an example embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for securing connections between a network controller and "untrusted" network agents (e.g., network agents that have not previously connected to and been verified by the network controller) in a container-based environment are described herein. In particular, embodiments herein provide techniques for generating network-agent specific tokens, such that each network agent running on an external node uses not only a shared service account (e.g., a service account associated with a VPC associated with a node running the network agent is running), but also a unique token assigned to the network agent when communicating with the network controller. For example, a request from a network agent running on an external node (e.g., VM) may include a purported name of the external node, as well as a unique token assigned to the network agent. A network controller receiving the request may use the received token to obtain a secret generated for the network agent associated with the token. The secret may have been generated prior to creation of the network agent, which transmitted the request, and may contain the real name of the external node (also referred to herein as the "expected external node name") for which the token was created. The secret may be maintained by an administrator of the VPC where the network agent is running. The network controller may compare the real name of the external node with the external node name included in the request. The network controller may trust the network agent and accept the connection where the real name of the external node matches the external node name included in the request, and not trust the network agent and deny the connection otherwise.

As such, techniques described herein provide an additional layer of protection against untrusted network agents. This additional layer of protection allows a network controller to verify that the network agent making a request to the network controller, is really the network agent the sender of the request is claiming to be. Accordingly, a threat actor whom obtains access to the token and attempts to connect to the network controller may be denied connection because an external node name included in a request to connect to the network controller may be different than an external node name associated with the same token and kept as a secret maintained by a VPC administrator. Thus, improved security against attacks on the network controller and/or a control plane in a container-based cluster may be achieved.

Though embodiments herein are described with respect to Antrea-specific network agents and an Antrea network controller, the techniques may be similarly applied to improve the security of communications between any networking and security solution which involves a centralized controller and multiple distributed agents, running for example, on VMs and/or bare-metal servers.

Figure 1A:
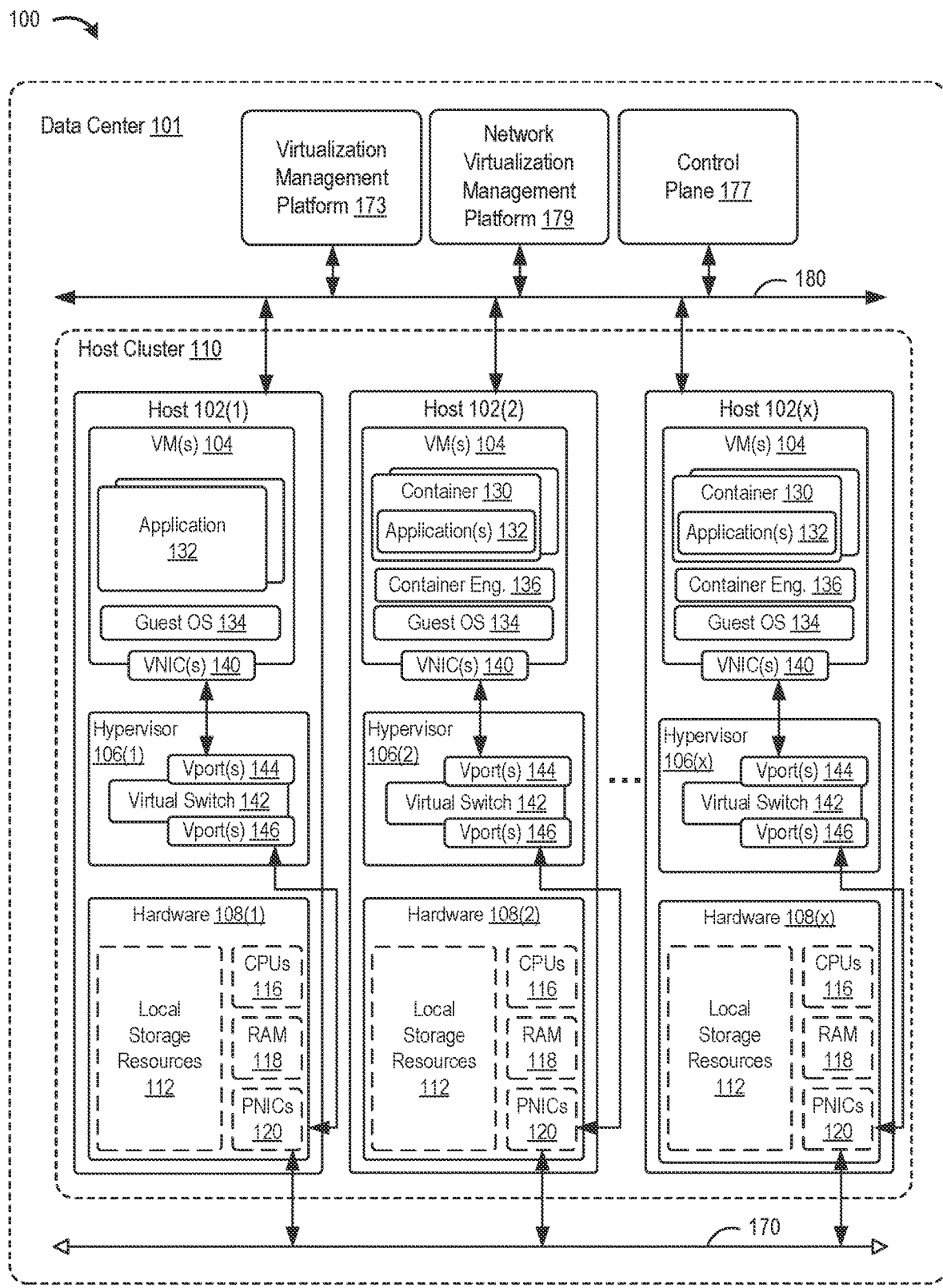
FIG. 1A depicts example physical and virtual network components in a networking environment in which embodiments of the present disclosure may be implemented

FIG. 1A depicts example physical and virtual network components in a networking environment 100 in which embodiments of the present disclosure may be implemented. Networking environment 100 includes a data center 101. Data center 101 includes one or more hosts 102, a management network 180, a data network 170, a virtualization management platform 173, a network virtualization management platform 179, and a control plane 177.

Host(s) 102 may be communicatively connected to management network 180 and data network 170. Data network 170 and management network 180 enables communication between hosts 102, and/or between other components and hosts 102.

Data network 170 and management network 180 may be separate physical networks or may be logically isolated using a single physical network and separate VLANs or logical overlay networks, or a combination thereof. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs $104_1$ to $104_N$ (collectively referred to as VMs 104 and individually referred to as VM 104) that run concurrently on the same host 102.

Host(s) 102 may be constructed on a server grade hardware platform 108, such as an x86 architecture platform. Hardware platform 108 of each host 102 includes components of a computing device such as one or more processors (central processing units (CPUs)) 116, memory (random access memory (RAM)) 118, one or more network interfaces (e.g., physical network interfaces (PNICs) 120), storage 112, and other components (not shown). CPU 116 is configured to execute instructions that may be stored in memory 118, and optionally in storage 112. The network interface(s) enable hosts 102 to communicate with other devices via a physical network, such as management network 180 and data network 170.

In certain embodiments, hypervisor 106 runs in conjunction with an operating system (OS) (not shown) in host 102. In some embodiments, hypervisor 106 can be installed as system level software directly on hardware platform 108 of host 102 (often referred to as "bare-metal" installation) and be conceptually interposed between the physical hardware and the guest OSs executing in the VMs 104. It is noted that the term "operating system," as used herein, may refer to a hypervisor.

Each of VMs 104 running on each host 102 may include virtual interfaces, often referred to as virtual network interfaces (VNICs), such as VNICs 140, which are responsible for exchanging packets between VMs 104 and hypervisor 106, such as with a virtual switch 142 running in the hypervisor 106. The virtual switch on each host operates as a managed edge switch implemented in software by a hypervisor on each host. Virtual switches provide packet forwarding and networking capabilities to VMs running on the host. VNICs 140 can connect to Vports 144, provided by virtual switch 142. In this context "connect to" refers to the capability of conveying network traffic, such as individual network packets, or packet descriptors, pointers, identifiers, etc., between components so as to effectuate a virtual datapath between software components. Virtual switch 142 also has Vport(s) 146 connected to PNIC(s) 120, such as to allow VMs 104 (and containers 130 running in VMs 104, as described below) to communicate with virtual or physical computing devices outside of host 102 via data network 170 and/or management network 180.

Further, each of VMs 104 implements a virtual hardware platform that supports the installation of a guest OS 134 which is capable of executing one or more applications 132. Guest OS 134 may be a standard, commodity operating system. Examples of a guest OS include Microsoft Windows, Linux, and/or the like. Applications 132 may be any software program, such as a word processing program.

Network virtualization management platform 179 is a physical or virtual server that orchestrates a software-defined network layer. A software-defined network layer includes logical network services executing on virtualized infrastructure (e.g., of hosts 102). The virtualized infrastructure that supports logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure.

In certain embodiments, network virtualization management platform 179 includes one or more virtual servers deployed as VMs. In certain embodiments, network virtualization management platform 179 installs agents in hypervisor 106 to add a host 102 as a managed entity, referred to as an edge transport node. An edge transport node may be a gateway (e.g., implemented by a router) between the internal logical networking of hosts 102 and an external network. Data center 101 also includes physical network devices (e.g., physical routers/switches), which are not explicitly shown in FIG. 1.

One example of a software-defined networking platform that can be configured and used in embodiments described herein as network virtualization management platform 179 and the software-defined network layer is a VMware NSX® platform made commercially available by VMware, Inc. of Palo Alto, California.

Virtualization management platform 173 is a computer program that executes in a host 102 in data center 101, or alternatively, virtualization management platform 173 runs in one of VMs 104. Virtualization management platform 173 is configured to carry out administrative tasks for data center 101, including managing hosts 102, managing (e.g., configuring, starting, stopping, suspending, etc.) VMs 104 running within each host 102, provisioning VMs 104, transferring VMs 104 from one host 102 to another host 102, and/or the like.

In certain embodiments, data center 101 includes a container orchestrator that implements an orchestration control plane 177 (also referred to herein as "control plane 177"), such as a Kubernetes control plane, to deploy and manage applications 132 (and their associated workloads) and/or services thereof on hosts 102, of a host cluster 110, using containers 130. In particular, one or more VMs 104 include a container engine 136 installed therein and running as a guest application under control of guest OS 134. Container engine 136 is a process that enables the deployment and management of virtual instances, referred to herein as "containers," in conjunction with OS-level virtualization on guest OS 134 within VM 104 and the container orchestrator. Containers 130 provide isolation for user-space processes executing within them. Containers 130 encapsulate an application 132 (and its associated workloads) as a single executable package of software that bundles application code together with all of the related configuration files, libraries, and dependencies required for it to run.

Control plane 177 runs on a cluster of hosts 102 and may deploy containerized applications as containers 130 on the cluster of hosts 102. Control plane 177 manages the computation, storage, and memory resources to run containers 130 in the host cluster. Further, control plane 177 supports the deployment and management of applications (or services) in the container-based cluster using containers 130. In certain embodiments, hypervisor 106 is integrated with control plane 177 to provide a "supervisor cluster" (i.e., management cluster) that uses VMs 104 to implement both control plane nodes and compute objects managed by control plane 177 (e.g., Kubernetes control plane).

In certain embodiments, control plane 177 deploys applications 132 as pods of containers running on hosts 102, either within VMs 104 or directly on an OS of hosts 102. A pod is a group of one or more containers 130 and a specification for how to run the containers 130. A pod may be the smallest deployable unit of computing that can be created and managed by control plane 177.

Figure 1B:
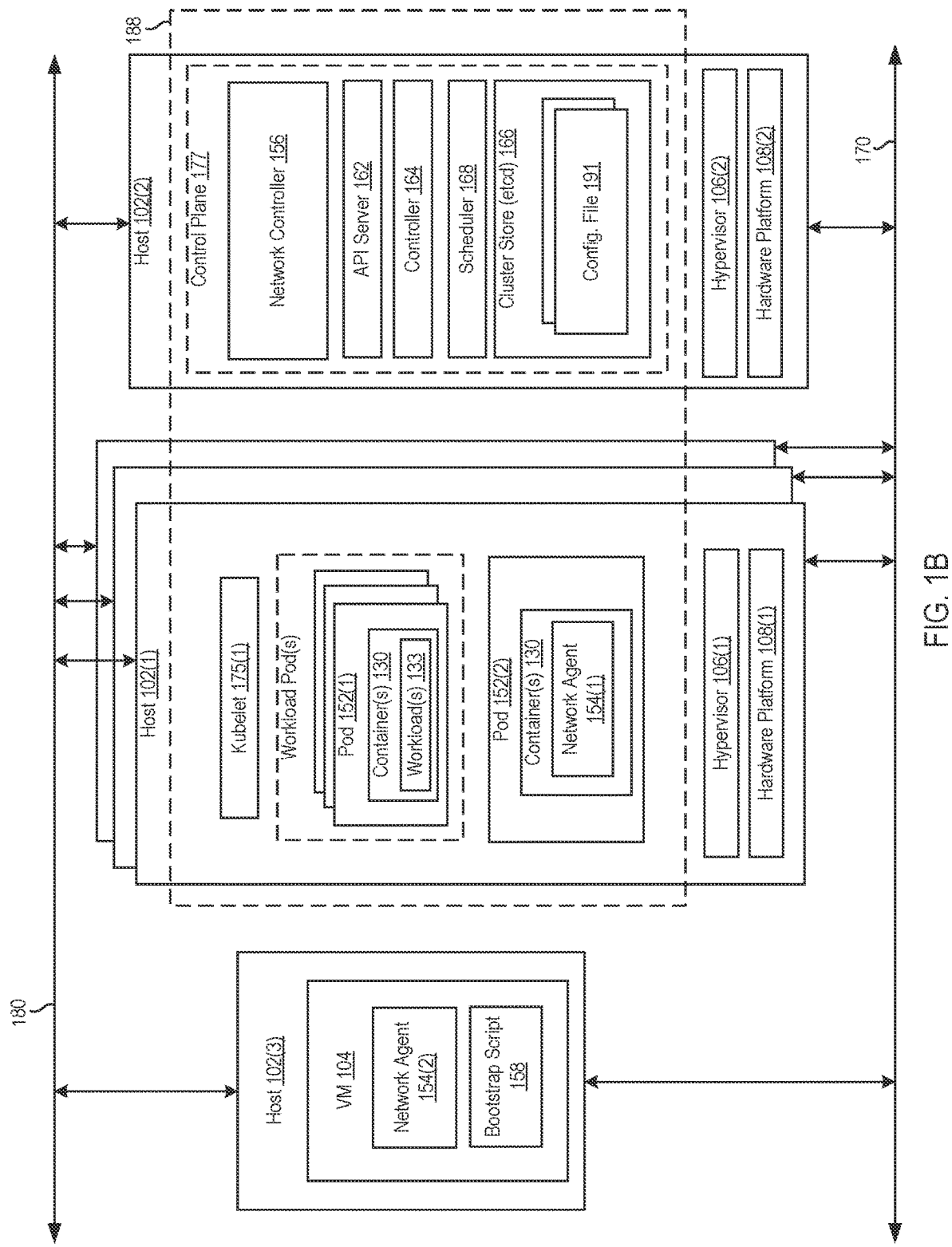
FIG. 1B illustrates an example environment including a network controller and multiple network agents for implementing networking and security functionality in a distributed system, according to an example embodiment of the present disclosure.

An example container-based cluster for running containerized applications 132 (represented as containerized workloads 133) is illustrated in FIG. 1B. While the example container-based cluster shown in FIG. 1B is a Kubernetes cluster 188, in other examples, the container-based cluster may be another type of container-based cluster based on container technology, such as Docker Swarm clusters.

As illustrated in FIG. 1B, Kubernetes cluster 188 is formed from a combination of one or more pods 152 including one or more containers 130, one or more kubelets 175, and a control plane 177 running on one or more nodes. As described above, a node may be a physical machine, such as a host 102, or a VM 104 (not shown in FIG. 1B) configured to run on a host 102 running a hypervisor 106. The nodes may be a combination of worker nodes (e.g., running pods 152, containers 130, and kubelets 175) and control plane nodes (e.g., running components of control plane 177). For the example Kubernetes cluster 188, the nodes are hosts 102, and more specifically, host 102(1) is a worker node while host 102(2) is a control plane node.

Pods 152 and/or containers 130 may be organized into one or more namespaces (not shown) in Kubernetes cluster 150. For example, a first set of pods 152, as well as containers 130 running thereon, may belong to a first namespace, while a second set of pods 152, and their associated containers 130, belong to a second namespace. As described above, namespaces help to provide API and resource isolation between user applications 132 (and their associated workloads 133) in Kubernetes cluster 188.

Kubelet 175 (e.g., on each worker node) is an agent that helps to ensure that one or more pods 152 run on each worker node according to a defined state for the pods 152, such as defined in a configuration file. Each pod 152 may include one or more containers 130.

Control plane 177 (e.g., running on control plane node(s)) includes components such as an API server 162, a cluster store (etcd) 166, controller(s) 164, and scheduler(s) 168. Control plane 177's components make global decisions about Kubernetes cluster 150 (e.g., scheduling), as well as detect and respond to cluster events. Control plane 177 manages and controls components of Kubernetes cluster 150. Control plane 177 handles most, if not all, operations within Kubernetes cluster 150, and its components define and control Kubernetes cluster 150's configuration and state data. Control plane 177 configures and runs the deployment, management, and maintenance of the containerized applications 132. As such, ensuring high availability of the control plane 177 is important for container deployment and management.

API server 162 operates as a gateway to Kubernetes cluster 188. As such, a command line interface, web user interface, users, and/or services communicate with Kubernetes cluster 150 through API server 162. One example of a Kubernetes API server 162 is kube-apiserver. Instances of kube-apiserver are designed to scale horizontally-that is, this component scales by deploying more instances. Several instances of kube-apiserver may be run, and traffic may be balanced between those instances.

Controller(s) 164 is responsible for running and managing controller processes in Kubernetes cluster 150. For example, control plane 177 may have (e.g., four) control loops called controller processes, that watch the state of Kubernetes cluster 150 and try to modify the current state of Kubernetes cluster 188 to match an intended state of Kubernetes cluster 188. In certain embodiments, controller processes of controller(s) 164 are configured to monitor for changes to the state of Kubernetes cluster 188.

Scheduler(s) 168 is configured to allocate new pods 152 to the worker nodes (e.g., hosts 102). Additionally, scheduler(s) 168 may be configured to distribute workloads 133, across containers 130, pods 152, and/or nodes (e.g., in some cases, hosts 102) that are assigned to use resources of hardware platform 108. Resources may refer to processor resources, memory resources, networking resources, and/or the like. In some cases, scheduler(s) 168 may schedule newly created containers 130 to one or more of the nodes in Kubernetes cluster 150.

Cluster store (etcd) 166 is a data store, such as a consistent and highly-available key value store, used as a backing store for Kubernetes cluster 188 data. In certain embodiments, cluster store (etcd) 166 stores configuration file(s) 191, made up of one or more manifests or specifications that declare intended system infrastructure and workloads 133 to be deployed in Kubernetes cluster 188. Kubernetes objects, or persistent entities, can be created, updated, and deleted based on configuration file(s) 191 to represent the state of Kubernetes cluster 188. As described above, these objects may be native Kubernetes objects and/or custom resource objects (e.g., custom resources created by Kubernetes cluster based on custom resource specifications received by the cluster), such as network interface objects and subnet port objects, created specifically for Kubernetes cluster 150.

In certain embodiments, control plane 177 additionally includes a network controller 156. Network controller 156 may be deployed as part of a networking and security solution for Kubernetes cluster 188. The networking and security solution may be a Software-as-a-Service (SaaS)-based networking and security offering developed, to overcome the technical challenges of traditional network architecture and tools. Specifically, a SaaS platform is a software distribution platform in which a software provider hosts cloud-based services, such as cloud-based network and security services, and makes them available to end users over the Internet. An example of network controller 156 includes an Antrea Controller provided as part of an Antrea solution made commercially available by VMware, Inc. of Palo Alto, California.

Network controller 156 is configured to watch API server 162 for any requests and/or updates around network policy, pod 152 networking, and/or namespace networking, and if there are any requests and/or the updates, the network controller may create and/or update one or more network policies and distributes the policy(ies) to one or more network agents 154. Network controller 156 leverages API server 162 implement a communication channel to each of network agent(s) 154.

Network agent(s) 154 may be deployed in one or more pods 152 on one or more worker nodes in Kubernetes cluster 188. Each network agent 154 may create a network interface for a pod 152 running the respective network agent 154, allocate an IP address, and connect the created network interface to a virtual switch (e.g., such as Open vSwitch). As such, each network agent 154 is responsible for implementing pod networking in Kubernetes cluster 188.

Figure 2:
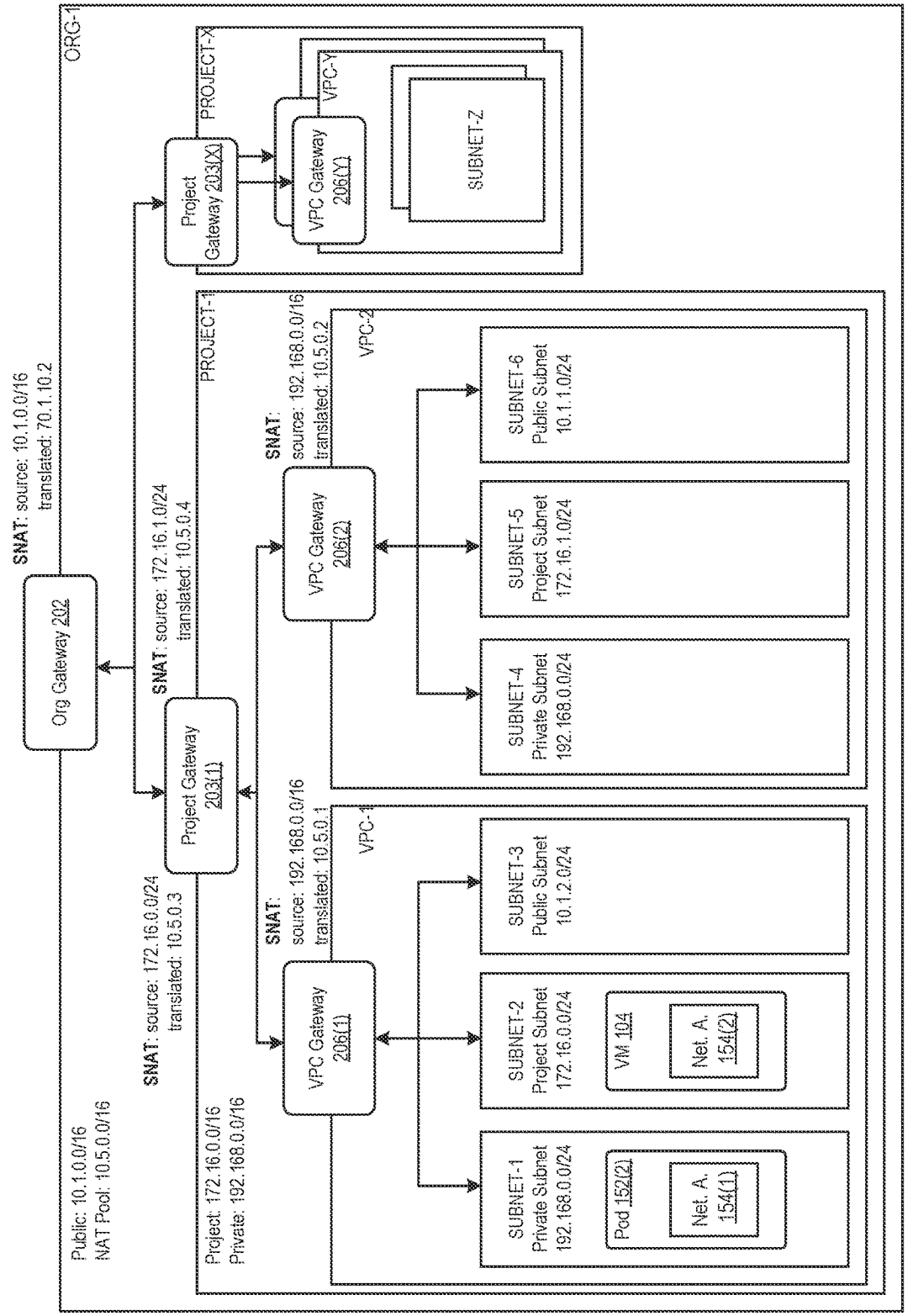
FIG. 2 illustrates example isolation constructs implemented to provide basic isolation capabilities for networking and security in multi-tenancy architecture, according to an example embodiment of the present disclosure.

In certain embodiments, one or more network agents 154 are also running on one or more non-Kubernetes nodes (e.g., "external nodes"), such as VM 104, deployed on host 102(3) in FIG. 2. In particular, network agent 154(2) may be deployed on VM 104 to allow network controller 156 to also manage the network connectivity and security on VM 104, outside of Kubernetes cluster 188.

In addition to VM 104, host 102(3) may also include a bootstrap script 158. Bootstrap script 158 allow installation, management, and/or configuration of tools useful for cluster monitoring and data loading. In certain embodiments, bootstrap script 158 is responsible for creating network agent 154(2) on VM 104. Further, as described in detail below with respect to FIG. 3B and 3C, bootstrap script 158 is configured to obtain a unique token created for VM 104, update a kubeconfig file running on VM 104 with the token, and run network agent 154(2) on VM 104 following the update.

In certain embodiments, network agent 154(1) running in pod 152(2) on host 102(1) and network agent 154(2) running in VM 104 are assigned to a same VPC, and more specifically, subnet(s) of a same VPC. The VPC is a logically isolated section of a networking environment. The isolation may be in the form of policies such as network policies and permissions applied to VMs, pods, and/or containers assigned to, tagged with, or otherwise associated with the VPC. One or more subnets are created for each VPC. A subnet, or subnetwork, is a logical partition of an IP network.

FIG. 2 illustrates example isolation constructs implemented to provide basic isolation capabilities for networking and security in a multi-tenancy architecture 200. As illustrated in FIG. 2, the isolation constructs implemented for networking and security isolation may include orgs (although only one is illustrated in FIG. 2, other orgs may exist), projects, VPCs, and subnets. These isolation constructs may be created for nodes running network agent(s) 154 in a distributed system, such as described in FIG. 1B. In particular, as illustrated in FIG. 2, network agent 154(1) running in pod 152(2) and network agent 154(2) running in VM 104 (e.g., described with respect to FIG. 1B) may be assigned to different subnets of a same VPC.

In FIG. 2, the illustrated org corresponds to a single tenant in architecture 200. The org may include one or more projects (e.g., {Project-1, . . . , Project-X}). Each project is associated with a sub-tenant of a tenant corresponding to the org (and multiple projects may be created for a single sub-tenant). Projects are created under each org to support independent sets of configurations for each sub-tenant of the tenant which the org corresponds to. Each org (shown as org-1) is associated with an org gateway 202. Each project (shown as project-1 and project-X) is associated with a project gateway 203. Further, each VPC (shown as VPC-1, VPC-2, and VPC-Y) is associated with a VPC gateway 206.

Each project is, conceptually, a container of VPCs. In particular, each project may include one or more VPCs, such as example Project-1 which includes {VPC-1, VPC-2} in architecture 200. For example, the VPCs of a particular project may be associated with the project by identifiers for the VPCs included in a project configuration, or identifiers of the project being included in configurations for each of the associated VPCs, or some other data structure may provide some indication of the association of project to a set of VPCs within that project.

Each VPC includes one or more subnets. For example, VPC-1 includes subnet-1, subnet-2, and subnet-3. VPC-2 includes subnet-4, subnet-5, and subnet-6.

As shown, subnet-1 includes pod 152(2) (e.g., having network agent 154(1)), while subnet-2 includes VM 104 (e.g., having network agent 154(2)) described above with respect to FIG. 1B. Subnet-1 and subnet-2 each belong to VPC-1; thus, both pod 152(2) and VM 104 belong to the same VPC.

Pod 152(2) belonging to subnet-1 and VM 104 belonging to subnet-2 are assigned IP addresses from a given classless inter-domain routing (CIDR) block associated with their corresponding subnets. The IP addresses may belong to an IP address space of a physical network to which pods and/or VMs of each subnet are coupled, or of a logical overlay network to which the pods and/or VMs are coupled. Pods and/or VMs of a given subnet may share the same connectivity, security, and availability requirements. Example connectivity provided by each subnet may include private connectivity (e.g., a private subnet), project connectivity (e.g., a project subnet), or public connectivity (e.g., a public subnet). Additional details regarding subnet connectivity modes are provided in U.S. patent application Ser. No. 18/121,548, filed Mar. 14, 2023, and entitled "Multiple Connectivity Modes for Containerized Workloads in a Multi-Tenant Network," the entire contents of which are incorporated herein by reference.

Further, assigning pod 152(2), including network agent 154(1), to subnet-1 of VPC-1 enables network agent 154(1) to use a service account created for VPC-1 to communicate with API server 162 and network controller 156 (e.g., both illustrated in FIG. 1B). Similarly, assigning VM 104, including network agent 154(2), to subnet-2 of VPC-1 enables network agent 154(2) to also use the service account created for VPC-1 to communicate with API server 162 and network controller 156. As described above, the service account assigned to VPC-1 is a type of non-user account that provides a distinct identity for cluster components running within VPC-1. In particular, cluster components running within a VPC, may use credentials of a particular service account assigned to the VPC to identify as that service account. This identity may be useful in various situations, including authenticating to network controller 156 (and/or API server 162).

According to techniques described herein, to improve security when communicating with network controller 156 (and/or API server 162), network agents deployed on external nodes, including network agent 154(2), may also use a unique token created for the network agent, in addition to the service account of VPC-1. As described in detail below, network controller 156, after receiving a request from a network agent 154 (e.g., running on an external node) with the network agent 154's token, may use the token to obtain a secret previously generated for the network agent 154 transmitting the request. The secret may contain a name of an external node expected to be associated with the token. Network controller 156 may compare the expected name of the external node with an external node name included in the request to determine whether or not the request is, in fact, from the network agent running on an external node associated with the external node name, or alternatively, from a threat actor alleging to be the network agent (e.g., based on the threat actor obtaining authentication information for the network agent the threat actor is alleging to be).

Figure 3A:
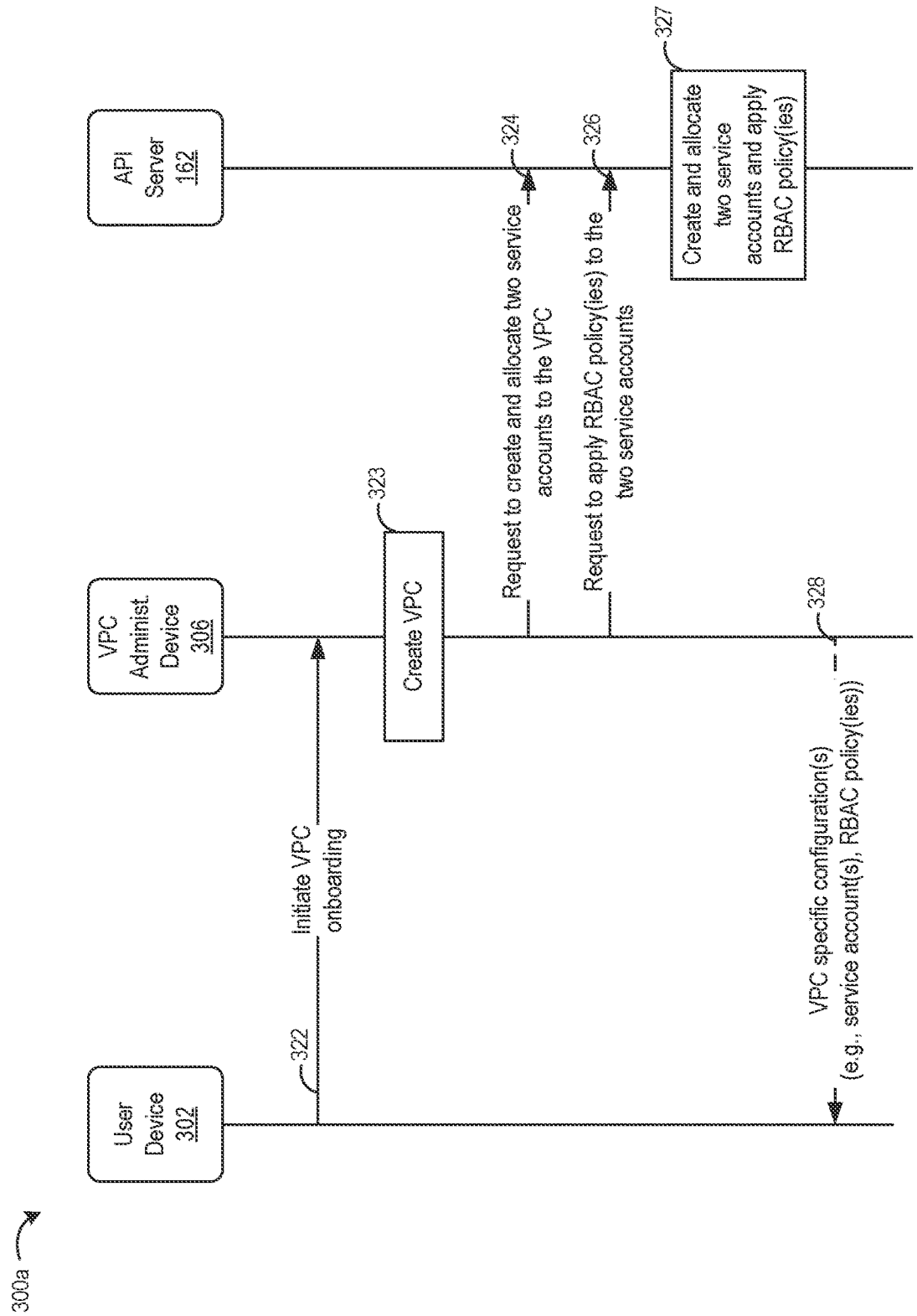
FIGS. 3A, 3B, and 3C provide call flow diagrams illustrating example signaling for network agent authentication, according to example embodiments of the present disclosure.
Figure 3B:
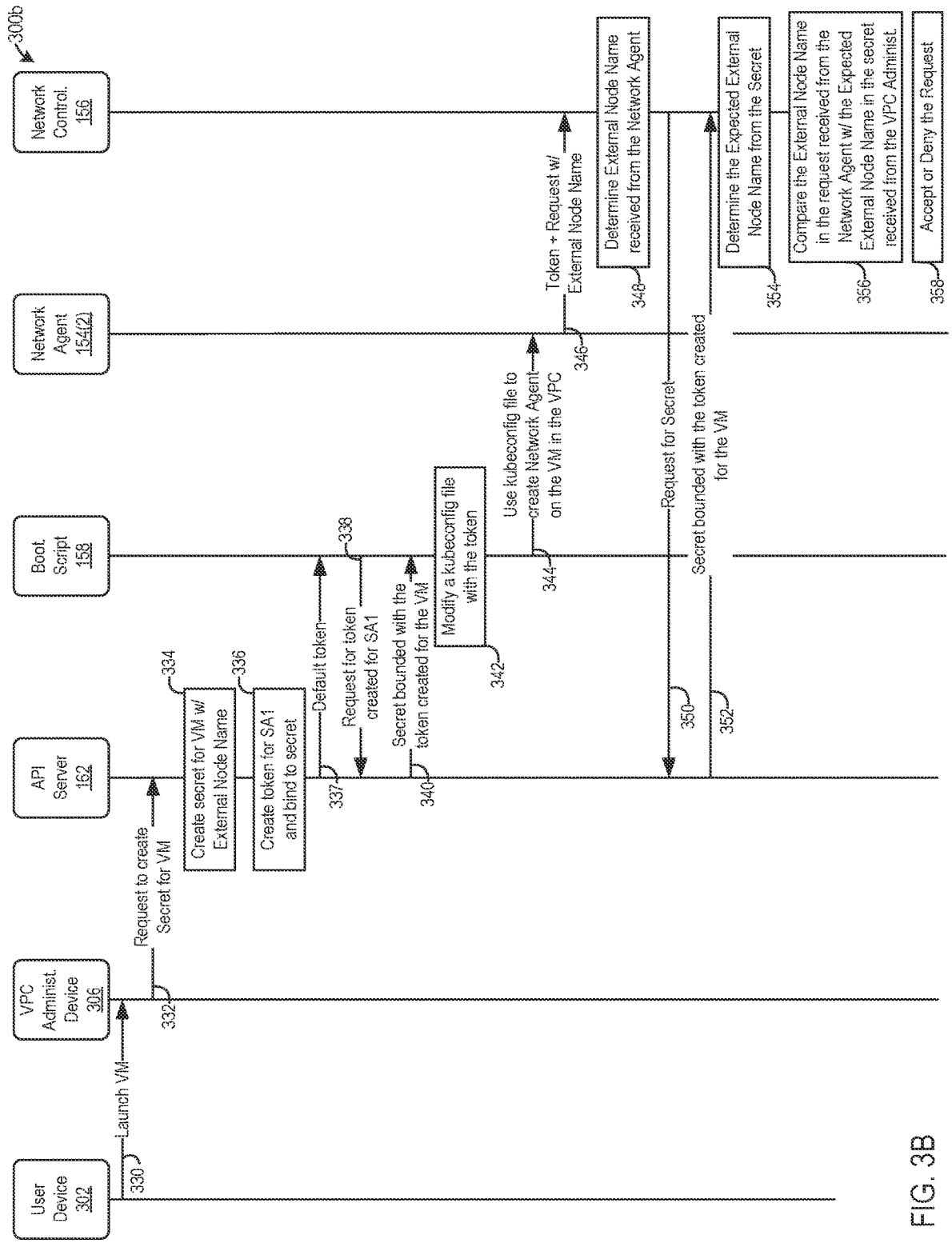
Figure 3C:
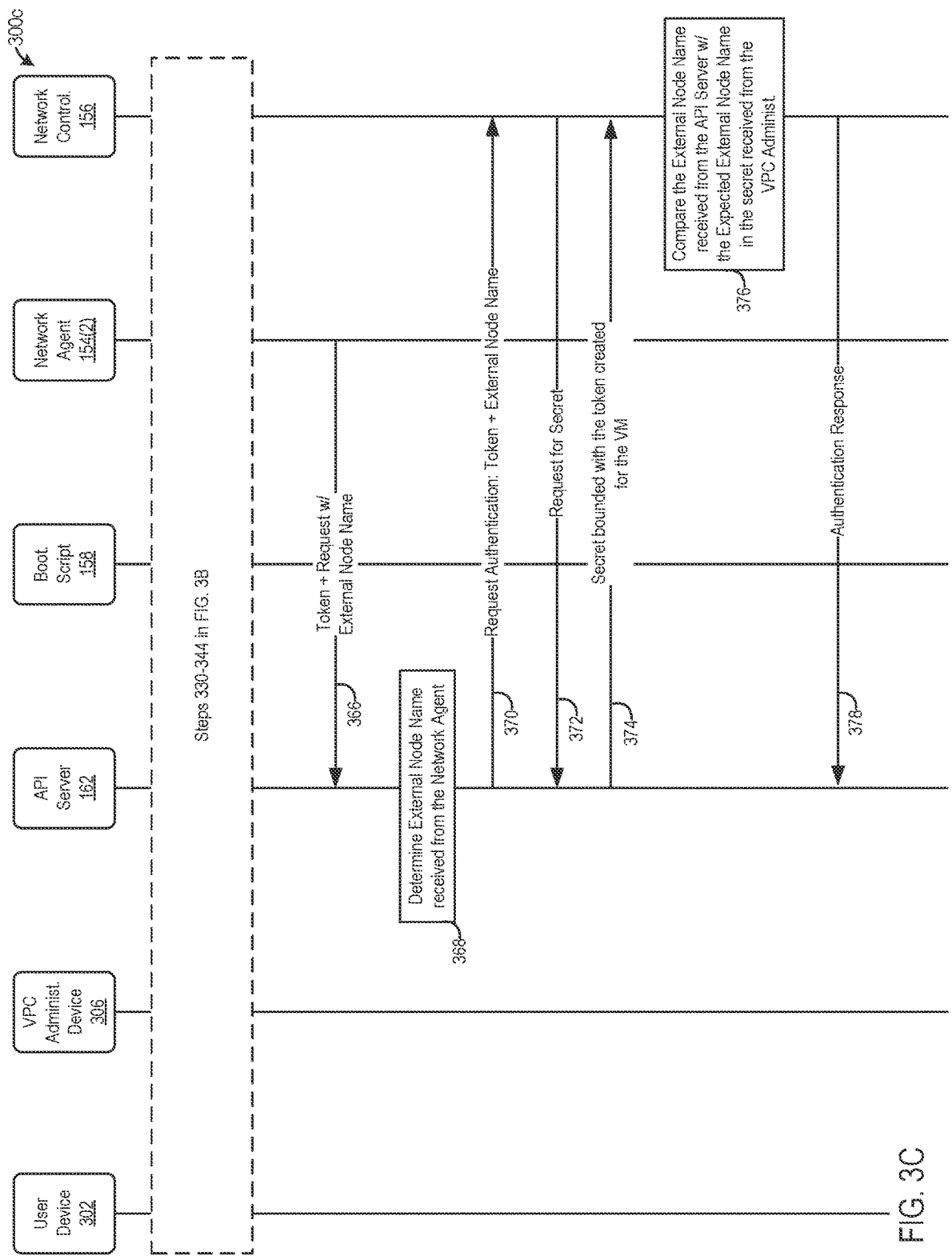

For example, FIGS. 3A, 3B, and 3C provide call flow diagrams 300*a*, 300*b*, and 300*c*, respectively, illustrating example signaling for network agent 154 authentication using VPC-specific service accounts and network-agent specific tokens. More specifically, FIG. 3A is a call flow diagram 300*a* illustrating example signaling between a user device 302, a VPC administrator device 306, and an API server, such as API server 162 illustrated in FIG. 1B. The signaling in call flow diagram 300*a* may be used to create two service accounts when onboarding a VPC. The service accounts may be used by components assigned to the VPC when communicating with API server 162 and/or a network controller associated with a SaaS-based networking and security offering (e.g., such as Antrea).

User device 302 may include any device, mechanism, system, interactive display, and/or various other hardware and software components for communicating information to, at least, VPC administrator device 306. Example user devices may include a phone, a tablet, and/or a desktop computer having a client installed thereon (e.g., such as a web browser) to access a cloud platform. VPC administrator device 306 is a system used to manage VPC resources and VM images. VPC administrator device 306 is enabled to access, at least, API server 162 to perform actions, such as requesting the creation of secret(s) and service account(s), as described in detail below. An example of VPC administrator device 306 is Nephe (e.g., an open-source product) made available by VMware, Inc. of Palo Alto, California.

FIGS. 3B and 3C are call flow diagrams 300b and 300c, respectively, illustrating example signaling between the user device 302, a VPC administrator device 306 associated with the VPC created in FIG. 3A (also referred to as the "cloud manager"), a bootstrap script, such as bootstrap script 158 illustrated in FIG. 1B, a network agent deployed on an external node, such as network agent 154(2) illustrated in FIG. 1B, and a network controller, such as network controller 156 also illustrated in FIG. 1B. Signaling in call flow diagram 300b illustrates a first option for authenticating requests from a network agent deployed on an external node (e.g., network agent 154(2)), while signaling in call flow diagram 300c illustrates a second option for authenticating requests from the network agent.

Call flow diagram 300a in FIG. 3A begins, at step 322, with user device 302 initiating onboarding of a VPC in a networking environment. For example, step 322 may include transmitting, by user device 302 to VPC administrator device 306, a request to onboard VPC-1 illustrated in FIG. 2. Onboarding a VPC may include (1), creating the VPC, (2) creating service account(s) for the VPC, and (3) applying role-based access control (RBAC) to the service account(s).

Accordingly, call flow diagram 300a then proceeds, at step 323, with VPC administrator device 306 creating the VPC, such as VPC-1 illustrated in FIG. 2. At step 324, VPC administrator device 306 transmits, to API server 162, a request to create and allocate two service accounts (e.g., a first service account (SA0) and a second service account (SA1)) to the VPC. A service account is a digital identity used by an application and/or component to interact with other applications and/or components. Further, at step 326, VPC administrator device 306 transmits, to API server 162, a request to apply RBAC policy(ies) to the two service accounts. RBAC policies may govern the behavior of each created service account. More specifically, application of the RBAC policy(ies) to the two created service accounts limits access of the service accounts (e.g., when used by components running within the VPC) to particular network resources. In response to receiving the request, at step 327, API server 162 creates and allocates the two service accounts, as well as applies the RBAC policy(ies) to the two created service accounts.

Here, the first service account (SA0) is created only with privileges for obtaining a runtime token (token11) for the second service account (SA1). For example, the first service account (SA0) may be used to create a unique token per external node (e.g., VM) running within the VPC. The second service account (SA1) may be used during runtime to allow components (e.g., network agent(s) of external node(s) and/or a network controller 156 within the VPC) to communicate with other components (e.g., API server 162 and/or network controller 156).

A default token (token 10) may be created for the second service account (SA1), which is shared by each external node (e.g., VM) running in the VPC. Each external node may use the default token (token 10) as the initial token to get their unique token (token11). The default token (token10) for the second service account (SA1) may be shared in the VPC and encrypted in storage. Further, the default token (token10) may also be built inside an external node image (e.g., a VM image) with encryption. From a security perspective, the default token (token 10) is expected to be used only one time on each external node to obtain a unique token (token 11) per external node, and may be deleted on the external node after obtaining the unique token (token11) for that external node. In some other cases, the default token (token10) may not be stored in the external node image but instead provided by user device 302 when running a bootstrap script to obtain the unique token (token11).

Call flow diagram 300a then proceeds, at step 328, with optionally informing user device 302 of the VPC specific configuration(s) generated, including informing user device 302 about the two service accounts created and the RBAC policy(ies) applied.

As described above, after performing steps 322-328 in call flow diagram 300a, call flow diagram 300a may proceed to either call flow diagram 300b or call flow diagram 300c. Steps 330-344 in call flow diagram 300b may be the same steps 330-342 in call flow diagram 300c. However, steps 344-358 in call flow diagram 300b for performing authentication are different than steps 366-378 in call flow diagram 300c, also used to perform authentication.

Beginning with call flow diagram 300b, at step 330, user device 302 initiates the launch of a VM. For example, user device 302 may transmit a request, to VPC administrator device 306, to launch VM 104 illustrated in FIGS. 1B and 2. VM 104 may be launched and assigned to VPC-1 (e.g., associated with VPC administrator device 306).

Further, call flow diagram 300b includes, at step 332, VPC administrator device 306 sending, to API server 162, a request to create a secret for VM 104. Based on receiving the request, API server 162 creates the secret for VM 104. The secret created may include a key-value pair, where the key is an identifier of VM 104 (e.g., VM 104 may be a VM2 instance such that the identifier is "vm2-id"), and the value is an external node name of VM 104.

FIG. 4 illustrates an example secret 400 (e.g., type of file defined as "Kind: Secret" at 402) generated by API server 162, according to an example embodiment of the present disclosure. Example secret 400 includes as a key of a key-value pair, an identifier of VM 104 (e.g., "vm2-id"), shown at 404. Further, example secret 400 includes as a value of the key-value pair the name of VM 104 (e.g., the external node) (e.g., "vm2" at 406). The external node name "vm2" may be encoded with Base-64 (e.g., Base-64 encoding is a way of taking binary data and turning it into text.

Call flow diagram 300b proceeds, at step 336, with API sever 162 additionally creating a unique token (token 11) for VM 104. The token may be used, by VM 104, in combination with the second service account (SA1) when communicating with API server 162 and/or network controller 156 during runtime. The token (token 11) may be bound to the second service account (SA1) when VM 104 is launched.

Further, at step 336, API server 162 binds the token (token 11) created for VM 104 to the secret created at step 334.

FIG. 5 illustrates an example token generated in response to a token request, according to an example embodiment of the present disclosure. As shown, a file of "kind: TokenRequest" (e.g., shown at 502) may be used to request the generation of a token that is to be bound to a secret (e.g., "boundobjectRef": {"kind": "Secret" shown at 504) with a name "vm2-id" (e.g., having a key equal to "vm2-id" shown at 506). Based on the token request, a token may be generated, at 508, and bound to the identified secret.

FIG. 6 illustrates an example payload 600 for the token generated in response to the token request.

Call flow diagram 300b proceeds, at step 337, with API server 162 transmitting, to bootstrap script 158, a default token (token 10) such that bootstrap script 158 is able to use the default token (token 10) as the initial token to obtain the unique token (token 11) (e.g., created by API server 162 at step 336). Specifically, after receiving the default token (token 10), at step 338, bootstrap script 158 requests for the unique token (token 11), and at step 340, receives the secret bounded with the unique token created for VM 104.

At step 342, bootstrap script 158 modifies a kubeconfig for VM 104 file with the token (token 11). More specifically, the token (token 11) created for VM 104 and the second service account (SA1) are added into the kubeconfig file.

At step 344, bootstrap script 158 uses the kubeconfig file to create network agent 154(2) on VM 104 in the VPC. Creating network agent 154(2) using the kubeconfig file enables network agent to use the second service account (SA1) and the token created for VM 104 when communicating with API server 162 and/or network controller 156.

For example, call flow diagram 300b may proceed, at step 346, with network agent 154(2) transmitting a request and the token generated for VM 104 to network controller 156. The request may include an external node name. For example, in certain embodiments, the request is an Antrea Network Policy (ANP) internal objects watch request, where the external node name is used as an option in the request. In certain embodiments, the request is a NodeStatsSummary create request, where the external node name is included in the object NodeStatsSummary field. In certain embodiments, the request is an update-NetworkPolicyStatus create request, where the external node name is included in the object NodeStatsSummary field.

Different from existing solutions, network controller 156 performs authentication on the request sent from network agent 154(2) before fulfilling the request. The authentication may be used to confirm that the network agent 154(2) transmitting the request is the network agent associated with the token being used. In particular, where a threat actor has gained access to a network agent's token, the threat actor may use the compromised token to send requests to network controller 156. However, the external node name used in these requests may not be the external node name associated with the token, given the token has been compromised by the threat actor. As such, network controller 156 may perform authentication to confirm that the external node name included in the request and transmitted with the token matches an external node name associated with the token, and maintained as a secret by VPC administrator device 306.

For example, in response to receiving the request, call flow diagram 300b proceeds, at step 348, with network controller 156 determining the external node name included in the request. At step 350, network controller 156 transmits, to API server 162, a request to obtain the secret associated with the token (e.g., received with the request). At step 352, API server 162 identifies a secret bounded with the specific token and transmits this secret to network controller 156.

Call flow diagram 300b then proceeds, at step 354, with network controller 156 determining the expected external node name associated with the token. The expected external node name may be the value of a key-value pair included in the secret (e.g., as described above with respect to FIG. 4).

Call flow diagram 300b proceeds, at step 356, with network controller 156 comparing the external node name included in the request received from network agent 154(2) (e.g., received at step 346) to the expected external node name included in the secret received from VPC administrator device 306 (e.g., received at step 352). If the external node name included in the request matches the expected external node name included in the secret, then network controller 156 trusts network agent 154(2) and accepts the request at step 358. Alternatively, if the external node name included in the request does not match the expected external node name included in the secret, then network controller 156 does not trust network agent 154(2) and denies the request at step 358.

Call flow diagram 300c provides alternative steps for authenticating network agent 154(2). As described above, call flow diagram 300c includes steps 330-344, which are similar steps included in call flow diagram 300b and described in detail above. However, subsequent to step 344, instead of transmitting a request and the token generated for VM 104 to network controller 156 (e.g., as shown in call flow diagram 300b of FIG. 3B), the request and token are instead sent to API server 162 at step 366.

In response to receiving the request and token, at step 368, API server 162 determines the external node name included in the request received from network agent 154(2). At step 370, API server 162 requests that network controller 156 perform authentication of network agent 154(2), which transmitted the request to API server 162, by transmitting, to network controller 156, the determined external node name and the token received from network agent 154(2).

Network controller 156 performs authentication by verifying that the external node name included in the request is the external node name expected to be associated with the received token. For example, call flow diagram 300c proceeds, at step 372, with network controller 156 transmitting, to API server 162, a request to obtain the secret associated with the token (e.g., received from API server 162). At step 374, API server 162 identifies a secret bounded with the specific token and transmits this secret to network controller 156.

Call flow diagram 300c then proceeds, at step 376, with network controller 156 determining the expected external node name associated with the token. The expected external node name may be the value of a key-value pair included in the secret (e.g., as described above with respect to FIG. 4).

Call flow diagram 300c proceeds, at step 376, with network controller 156 comparing the external node name received from API server 162 (e.g., received at step 370) to the expected external node name included in the secret received from VPC administrator device 306 (e.g., received at step 374). If the external node name received from API server 162 matches the expected external node name included in the secret, then network controller 156 determines that network agent 154(2) should be trusted, and indicates, in an authentication response transmitted at step 378 to API server 162, that API server 162 can trust network agent 154(2) and that API server 162 should accept the request. Alternatively, if the external node name received from API server 162 does not match the expected external node name included in the secret, then network controller 156 determines that network agent 154(2) should not be trusted, and indicates, in the authentication response transmitted at step 378 to API server 162, that API server 162 cannot trust network agent 154(2) and that API server 162 should deny the request.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for authenticating a network agent deployed in a networking environment, comprising:
   receiving, by a network controller in the networking environment, a name of an external node where the network agent is running and a token associated with the external node;
   in response to receiving the name of the external node, obtaining, by the network controller, a secret associated with the token;
   parsing, by the network controller, the secret to determine an expected external node name corresponding to the token;
   comparing the expected external node name with the received external node name; and
   trusting the network agent when the expected external node name and the received external node name match.

2. The method of claim 1, further comprising:
   receiving, by the network controller, a request from the network agent; and
   accepting the request when the expected external node name and the received external node name match.

3. The method of claim 2, wherein the network controller receives the name of the external node and the token associated with the external node with the request from the network agent.

4. The method of claim 1, wherein:
   the networking environment is divided into one or more first level isolation constructs,
   each of the one or more first level isolation constructs is divided into one or more second level isolation constructs,
   each of the one or more second level isolation constructs is divided into one or more virtual private clouds, and
   the external node running the network agent is running in a first virtual private cloud of the one or more virtual private clouds.

5. The method of claim 4, wherein:
   an application programming interface (API) server deployed on a control plane of a container-based cluster creates the secret comprising the expected external node name and the token associated with the secret, and
   the secret is obtained by the network controller from the API server.

6. The method of claim 1, wherein the network controller receives the name of the external node and the token associated with the external node from an application programming interface (API) server deployed on a control plane of a container-based cluster, wherein the control plane is also running the network controller.

7. The method of claim 1, wherein a configuration file used to create the network agent on the external node is modified with the token.

8. A system comprising:
   one or more processors; and
   at least one memory, the one or more processors and the at least one memory configured to:
      receive, by a network controller in a networking environment, a name of an external node where a network agent is running and a token associated with the external node;
      in response to receiving the name of the external node, obtain, by the network controller, a secret associated with the token;
      parse, by the network controller, the secret to determine an expected external node name corresponding to the token;
      compare the expected external node name with the received external node name; and
      trust the network agent when the expected external node name and the received external node name match.

9. The system of claim 8, wherein the one or more processors and the at least one memory are further configured to:
   receive, by the network controller, a request from the network agent; and
   accept the request when the expected external node name and the received external node name match.

10. The system of claim 9, wherein the one or more processors and the at least one memory are configured to receive, by the network controller, the name of the external node and the token associated with the external node with the request from the network agent.

11. The system of claim 8, wherein:
    the networking environment is divided into one or more first level isolation constructs,
    each of the one or more first level isolation constructs is divided into one or more second level isolation constructs,
    each of the one or more second level isolation constructs is divided into one or more virtual private clouds, and
    the external node running the network agent is running in a first virtual private cloud of the one or more virtual private clouds.

12. The system of claim 11, wherein:
    an application programming interface (API) server deployed on a control plane of a container-based cluster creates the secret comprising the expected external node name and the token associated with the secret, and
    the secret is obtained by the network controller from the API server.

13. The system of claim 8, wherein the one or more processors and the at least one memory are configured to receive, by the network controller, the name of the external node and the token associated with the external node from an application programming interface (API) server deployed on a control plane of a container-based cluster, wherein the control plane is also running the network controller.

14. The system of claim 8, wherein a configuration file used to create the network agent on the external node is modified with the token.

15. A non-transitory computer-readable medium comprising instructions that, when executed by one or more processors of a computing system, cause the computing system to perform operations for authenticating a network agent deployed in a networking environment, the operations comprising:
    receiving, by a network controller in the networking environment, a name of an external node where the network agent is running and a token associated with the external node;
    in response to receiving the name of the external node, obtaining, by the network controller, a secret associated with the token;
    parsing, by the network controller, the secret to determine an expected external node name corresponding to the token;
    comparing the expected external node name with the received external node name; and
    trusting the network agent when the expected external node name and the received external node name match.

16. The non-transitory computer-readable medium of claim 15, wherein the operations further comprise:
receiving, by the network controller, a request from the network agent; and
accepting the request when the expected external node name and the received external node name match.

17. The non-transitory computer-readable medium of claim 16, wherein the network controller receives the name of the external node and the token associated with the external node with the request from the network agent.

18. The non-transitory computer-readable medium of claim 15, wherein:
the networking environment is divided into one or more first level isolation constructs,
each of the one or more first level isolation constructs is divided into one or more second level isolation constructs,
each of the one or more second level isolation constructs is divided into one or more virtual private clouds, and
the external node running the network agent is running in a first virtual private cloud of the one or more virtual private clouds.

19. The non-transitory computer-readable medium of claim 18, wherein:
an application programming interface (API) server deployed on a control plane of a container-based cluster creates the secret comprising the expected external node name and the token associated with the secret, and
the secret is obtained by the network controller from the API server.

20. The non-transitory computer-readable medium of claim 15, wherein the network controller receives the name of the external node and the token associated with the external node from an application programming interface (API) server deployed on a control plane of a container-based cluster, wherein the control plane is also running the network controller.

* * * * *